(12) United States Patent
Rolion et al.

(10) Patent No.: US 8,128,301 B2
(45) Date of Patent: Mar. 6, 2012

(54) MECHANISM FOR A WRITING IMPLEMENT, A WRITING IMPLEMENT INCLUDING MECHANISM, AND A METHOD OF MANUFACTURE

(75) Inventors: Franck Rolion, Asnières-sur-Oise (FR); Arnaud Bez, Garches (FR)

(73) Assignee: Societe Bic, Clichy Cedex (FR)

( * ) Notice: Subject to any disclaimer, the term of this patent is extended or adjusted under 35 U.S.C. 154(b) by 1232 days.

(21) Appl. No.: 11/572,732

(22) PCT Filed: Jul. 20, 2005

(86) PCT No.: PCT/FR2005/001866
§ 371 (c)(1),
(2), (4) Date: Jun. 22, 2007

(87) PCT Pub. No.: WO2006/018504
PCT Pub. Date: Feb. 23, 2006

(65) Prior Publication Data
US 2007/0248398 A1    Oct. 25, 2007

(30) Foreign Application Priority Data
Jul. 26, 2004  (FR) ...................... 04 08241

(51) Int. Cl.
*B43K 5/16*    (2006.01)
(52) U.S. Cl. ............... 401/116; 401/99; 401/77
(58) Field of Classification Search ............ 401/99, 401/109, 115–117, 68–79, 55, 112, 110
See application file for complete search history.

(56) References Cited

U.S. PATENT DOCUMENTS

| | | | | |
|---|---|---|---|---|
| 940,247 A * | 11/1909 | Haring | ............... | 401/32 |
| 2,630,215 A * | 3/1953 | Lynn | ............... | 401/78 |
| 2,648,553 A * | 8/1953 | Ulrich | ............... | 285/304 |
| 3,045,593 A * | 7/1962 | Petterson | ............... | 101/368 |
| 3,653,777 A | 4/1972 | Bross | | |
| 3,816,006 A * | 6/1974 | Tailer | ............... | 401/30 |
| 4,221,490 A * | 9/1980 | Malm | ............... | 401/29 |
| 4,380,402 A * | 4/1983 | Andrews et al. | ............... | 401/74 |
| 4,750,501 A * | 6/1988 | Ackermann et al. | ............... | 132/318 |
| 4,844,640 A * | 7/1989 | Ganz | ............... | 401/116 |
| 4,976,561 A * | 12/1990 | Kageyama | ............... | 401/75 |
| 5,048,991 A * | 9/1991 | Guo | ............... | 401/116 |
| 5,961,237 A * | 10/1999 | Kageyama et al. | ............... | 401/116 |
| 6,682,243 B2 * | 1/2004 | Iwamoto et al. | ............... | 401/75 |
| 7,147,392 B2 * | 12/2006 | Bedhome et al. | ............... | 401/35 |

FOREIGN PATENT DOCUMENTS

DE    2000 422    3/2000
FR    2 809 671 A1    12/2001

* cited by examiner

*Primary Examiner* — David J. Walczak
*Assistant Examiner* — Jennifer C Chiang
(74) *Attorney, Agent, or Firm* — Jones Day

(57) ABSTRACT

A writing implement mechanism comprises includes a tubular first element (10) having a central axis and including first and second walls (12, 14) presenting that include respective first and second edges (16, 18) defining a guide (20) extending longitudinally in a direction that is inclined relative to the central axis between a first end and a second end. The mechanism further comprises includes a second element (26) adapted to slide along the first element (10) and including a nib (28) sliding in the guide (20). The second wall (14) is offset towards the central axis relative to the first wall (12) in a direction that is radial relative to said the central axis (Z).

11 Claims, 3 Drawing Sheets

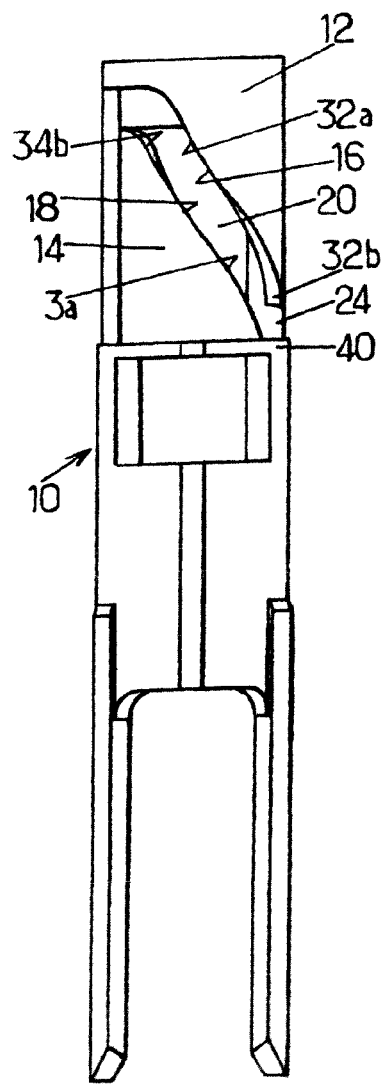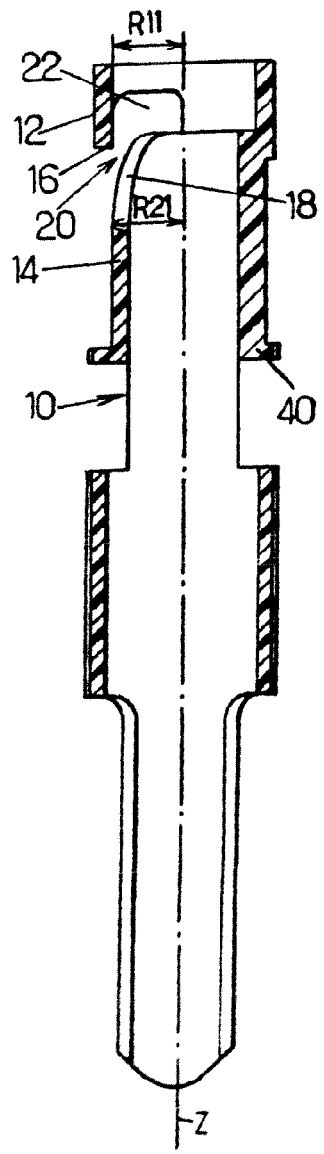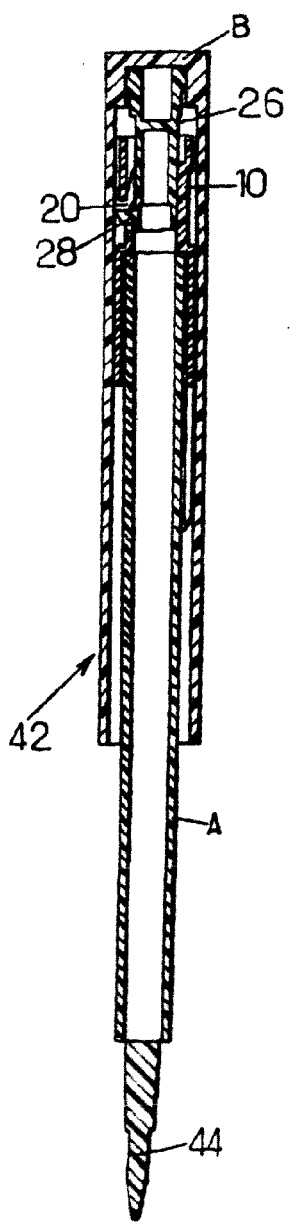

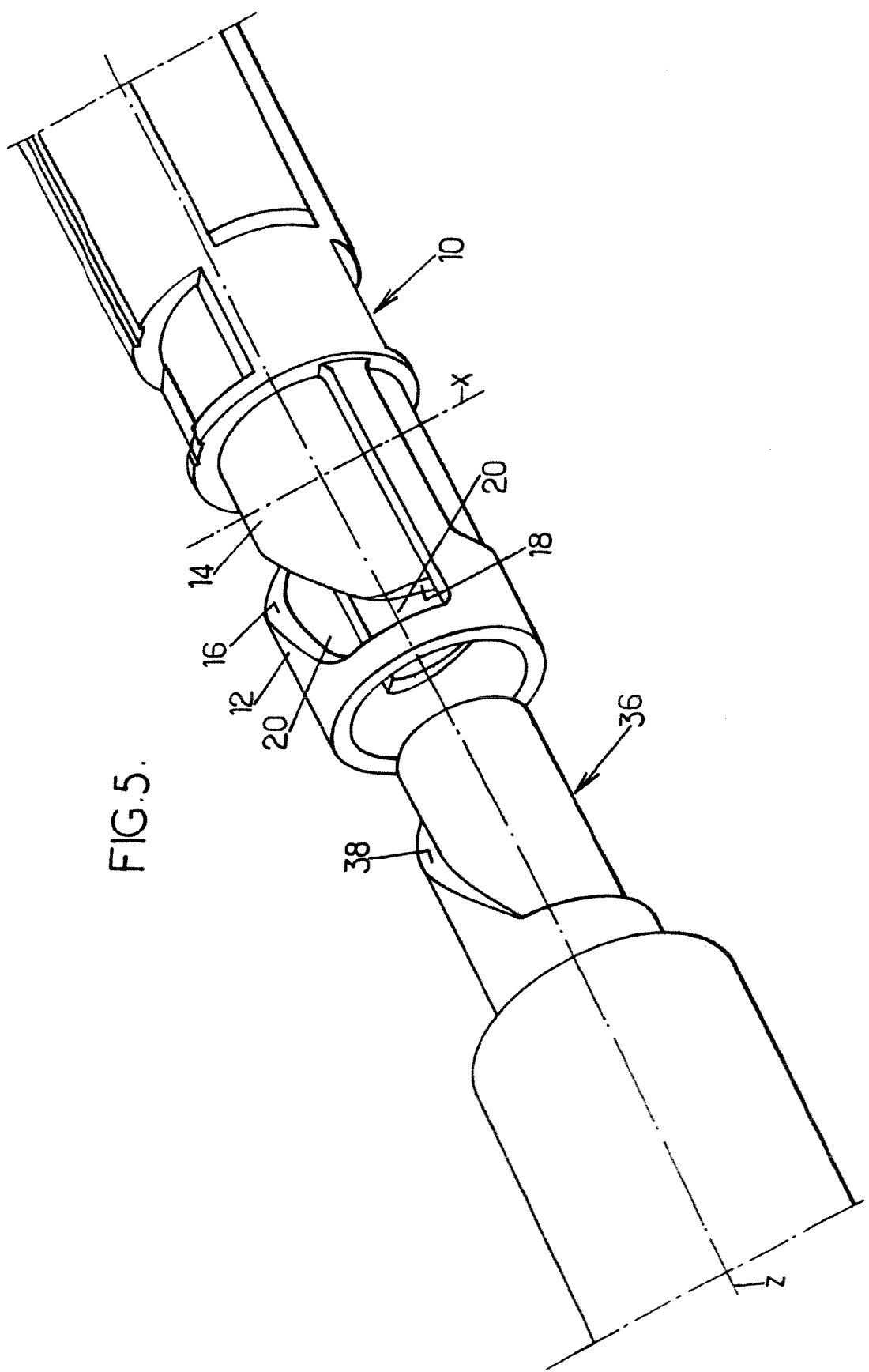

MECHANISM FOR A WRITING IMPLEMENT, A WRITING IMPLEMENT INCLUDING MECHANISM, AND A METHOD OF MANUFACTURE

This application is a national stage application of PCT/F2004/08241, filed on Jul. 26, 2004, the entire contents of which is incorporated herein.

FIELD OF THE INVENTION

The embodiments of the present invention relates to a writing implement mechanisms.

BACKGROUND OF THE INVENTION

More particularly, the embodiments of the present invention relate to a writing implement mechanism comprising a tubular first element having a central axis and comprising first and second walls respectively presenting first and second edges defining a guide extending longitudinally in a direction that is inclined relative to the central axis between a first end and a second end.

The mechanism further comprises a second element adapted to slide along the first element and including a nib sliding in the guide.

Numerous writing implements include such a mechanism for extending or retracting a writing tip.

In such mechanisms, the guide, also known as a cam path, is made in the form of a groove or a slot in which there slides a nib.

The guide may be helical, as in document FR-A-2 809 671, so as to transform a pivoting movement of one of the parts of the body of the writing implement into movement in translation of the tip along the longitudinal axis of the implement. Nevertheless, in that type of guide, it can be difficult to slide the nib in the guide because of friction, thus requiring the user to deliver greater force.

SUMMARY OF THE INVENTION

An object of the embodiments of the present invention is to improve prior art mechanisms, and in particular to make them more comfortable to use by limiting the friction between the first and second elements, but without thereby increasing manufacturing costs.

To this end, according to the an embodiment of the present invention, a mechanism of the kind in question is characterized in that the second wall is offset towards the central axis relative to the first wall in a direction that is radial relative to said the central axis.

By means of these dispositions, the edges defining the cam path are offset relative to each other, which is less constraining for manufacture and gives greater freedom in giving them an ideal profile. Specifically, it is thus possible by injection molding to make the first element with edges that are practically always tangential to the nib of the sliding second element, thereby improving contact between the edge and the nib so as to guide the nib better along the guide.

In various embodiments of the mechanism of the present invention, recourse may optionally be had to one or more of the following dispositions:

the guide extends longitudinally in a helical shape;
the walls constitute portions of cylinders;
at least one of the edges extends transversely in a direction that is radial relative to the central axis;
the first edge extends transversely in a direction that is radial relative to the central axis over a first fraction only of the guide, and the second edge extends transversely in a direction that is radial relative to the central axis over a second fraction of the guide;
the guide extends around the central axis over an angle lying in the range 60° to 180°;
the inside transverse end of the first edge presents a radius substantially equal to the radius of the outside transverse end of the second edge;
the second wall presents a collar having an outside radius substantially equal to the outside radius of the first wall, said collar presenting a face facing the edge of the first wall that extends in a plane that extends transversely to the central axis; and
the first element is made as a single piece of plastics material.

The embodiments of the present invention also provides a writing implement including a mechanism as defined above, in which the first element is connected to a first portion of the body of the implement and in which the second element is connected to the second portion of the body, the first and second portions being mounted to pivot relative to each other about the central axis.

Furthermore, the embodiments of the present invention also provides a method of manufacturing such a mechanism of the invention, the method being characterized by:

supplying at least two half-shells adapted to form the first edge and outside portions of the walls;
providing a core adapted to form the second edge and inside portions of the walls of the first element;
injecting material between the half-shells and the core; and then
moving the shells away radially in a direction that is radial relative to the axis, and withdrawing the core in a direction that is parallel to the central axis.

BRIEF DESCRIPTION OF THE DRAWINGS

Other characteristics and advantages of the embodiments of the present invention will appear from the following description of an embodiment given by way of non-limiting example and with reference to the accompanying drawings.

In the drawings:

FIG. 3 shows the first element of the mechanism of the an embodiment of the present invention in perspective;

FIG. 4 is a longitudinal section view of the first element of the mechanism of the an embodiment of the present invention;

FIG. 5 is a perspective view of the first element and a portion of the mold enabling the first element of the mechanism of the an embodiment of the present invention to be manufactured; and FIG. 6 is a longitudinal section view of a writing implement including the mechanism, shown in FIGS. 1 to 6.

DETAILED DESCRIPTION OF DRAWINGS

In the various figures, the same references designate elements that are identical or similar.

A mechanism of the an embodiment of the present invention may be applied to various writing implements, and in particular to implements of the ballpoint pen type, as shown in FIG. 6.

Figure 1:
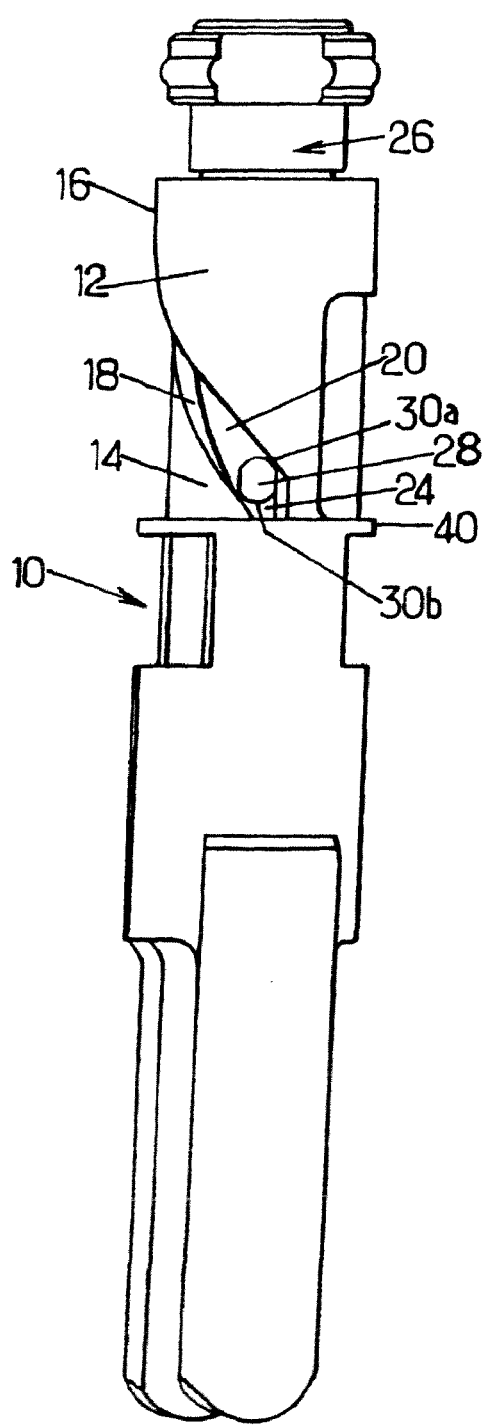
FIG. 1 is a perspective view of a mechanism of the an embodiment of the present invention in the storage position.

The mechanism enables the writing tip of the pen to be retracted, extended, or blocked in position by means of pivoting between a first portion A of the pen body relative to a second portion B of the pen body, each portion being connected respectively to first and second elements 10 and 26 of the mechanism of the an embodiment of the present invention, that can be seen more clearly in FIG. 1, showing the mechanism in its storage position. Nevertheless, the mechanism may be implemented to perform some other function of the writing implement, for example to control extending an eraser at the rear end of the implement, or to control a mechanism for advancing a pencil lead.

The mechanism comprises a tubular first element 10 extending longitudinally along a central axis (Z). This tubular element is made up of walls 12 and 14, each formed by a portion of a cylinder. The tubular element 10 has a first wall 12 and a second wall 14 presenting respectively first and second edges 16 and 18 defining a guide 20, or cam path, extending longitudinally between first and second ends 22 and 24 in a direction that is inclined relative to the central axis (Z).

The guide 20 is helical in shape, of regular pitch, covering an angular sector of 180° which represents the angle formed between the first end 22 and the second end 24. The second end 24 of the guide 20, which is disposed at 180° relative to the first end 22, can be seen in FIG. 2, in which the first element 10 has been turned through 180° relative to FIG. 1.

The mechanism further comprises a second element 26 that is adapted to slide along the first element 10 along the central axis (Z). To this end, it includes a nib 28 that is placed in the guide 20 and that slides therealong.

In FIG. 1, the second element 26 is in the storage position, i.e. the second element 26 is for the most part received inside the first element 10.

Figure 2:
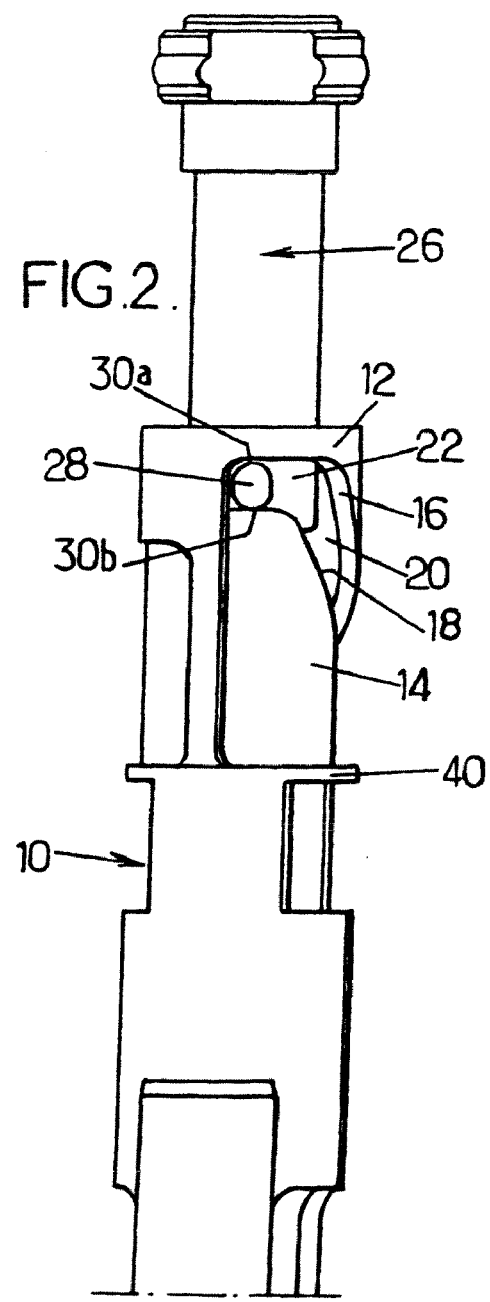
FIG. 2 is a view analogous to FIG. 1 showing the mechanism in the extended position.

The second element 26 slides between the storage position shown in FIG. 1 in which the nib 28 is situated at the second end 24 of the guide 20, and the extended position shown in FIG. 2 in which the nib 28 is situated in the first end 22 of the guide 20. The storage position of the mechanism corresponds to the retracted position of the writing tip, and the extended position of the mechanism corresponds to the extended position of the writing tip.

The guide 20 extends from its first end 22 in a plane extending transversely to the central axis Z so as to prevent the nib 28 from moving in translation along the central axis Z when the writing tip is in its extended position. However, the guide 20 extends at the second end 24 in a direction that is inclined relative to the axis Z so as to make it easier to slide the nib in order to bring the mechanism from the storage position to the extended position, and consequently to bring the writing tip from the retracted position to the extended position. The writing tip is connected to the first element 10 as a force-fit.

The nib 28 slides on the edges 16 and 18 of the guide. In addition, the first and second walls 12 and 14 are radially offset relative to the central axis Z. As shown in FIG. 4, the second wall 14 is offset at all points of its circumference in a radial direction towards the central axis Z away from the first wall 12. This disposition makes manufacture less constricting and gives greater freedom for giving the walls an ideal profile. Specifically, by using the method described below, it is possible to make the first element 10 with edges 16 and 18 that extend transversely in a radial direction relative to the central axis Z, and with this being true for any point taken along one of the edges 16 and 18 between the first and second ends of the guide.

As shown in FIG. 4, the inside transverse end of the first edge 16 presents a radius R11 that is substantially equal to the outside transverse end radius R21 of the second edge 18 so as to hold the nib 18 securely in a plane parallel to the two edges 16 and 18. Contrary to that which might have been imagined, it should be observed that the offset between the edges 16 and 18, i.e. the fact that R11 is greater than or equal to R21, does not have any harmful effect on guiding the nib 28.

The edges 16 and 18 extend transversely, i.e. in the width direction of the edges or in the thickness direction of the corresponding wall, in a direction that is radial relative to the central axis Z, and over a portion of the guide 20. In its length direction, each edge also forms a helix between the first and second ends 22 and 24 of the guide 20.

The nib 28 of the second element 26 extends radially and presents at least one rounded portion that co-operates with the edge (16 and/or 18). This produces tangential contact along a radial line between the nib 28 and one or the other of the edges 16 and 18, thereby limiting friction.

The width of the guide 20 is slightly greater than the width of the nib 28 so as to prevent the nib from becoming jammed in the guide. It is also possible for the nib 28 to bear mainly against one of the two edges and to come into contact with the other edge only rarely. This depends on the direction in which the first element 20 is urged by resilient means provided in the body of the pen. Under such circumstances, it suffices for the edge against which the nib 28 bears to be radial at all of its points between the first and second ends of the guide 20.

However, it is also possible for the nib 28 to come into contact with one of the edges when the mechanism is actuated in a first direction, and with the other edge when it is actuated in the other direction. Under such circumstances, both edges 16 and 18 can be accurately radial over their entire lengths.

Nevertheless, the pressure exerted by the nib 28 against an edge may vary as it slides along the guide 20, and consequently it is not essential for the guide to be radial over its entire length in order to ensure satisfactory comfort in actuation. Furthermore, in the embodiment shown, and as can be seen best in FIG. 3, the first edge 16 extends in a radial direction only over a first fraction 32a of the guide 20, and the second edge 18 extends in a radial direction over a fraction 34a situated in register with the non-radial fraction 32b of the first edge 16. The fractions 32b and 34b of the edges 16 and 18 that do not extend radially present a transverse direction that is slightly inclined so that the guide 20 flares outwards a little. The angle formed between the fractions 32b and 34b and an ideal radial direction forms a clearance angle making unmolding easier and avoiding the mold sliding against the edge.

An embodiment of the present invention operates as described below.

When the second element 26 is in the storage position, i.e., when the writing tip is in the retracted position, the nib 28 is situated in the second end 24 of the guide 20. The user then turns a portion of the writing implement A connected to the first element 10 of the mechanism relative to the other portion B of the writing implement which is connected to the second element 26 of the mechanism. This turning movement drives the nib 28 to slide along the guide 20. The nib 28 thus follows the path formed by the guide 20 by bearing against the first edge 16.

In the transverse direction, the first edge 16 presents a direction that is radial, and consequently it is tangential to the circular outlines 30a and 30b of the nib 28, thus providing contact that limits friction.

As a result, during displacement of the guide, the sliding of the nib 28 from the second end 24 towards the first end 22 of the guide 20 for the purpose of moving the writing tip from the retracted position to the extended position, is made easier by limiting friction and reducing the force that the user needs to apply. Then, once the nib 28 is located at the first end 22 of the guide 20, i.e. when the writing tip is in its extended position, the nib 28 comes to bear against the edge 18 of the second wall 14, which edge 18 presents a direction that is perpendicular relative to the central axis Z. Thus, the second element 26 is blocked against movement in translation between the first and second edges 16 and 18 defining the guide 20, thereby enabling the writing tip to be held in the extended position, to enable it to be used.

When the user seeks to retract the writing tip, the user turns the portion A of the writing implement that is connected to the first element 10, thereby driving the first element 10 and thus causing the nib 28 to slide in the guide towards the second end 24.

FIG. 6 shows a writing implement 42 of the ballpoint pen type including a mechanism of the an embodiment of the present invention.

The pen 42 has a writing tip 44 connected securely to the first element 10. The writing implement also has a body formed by two portions A and B, with the portion B remote from the writing tip 44 being secured to the second element 26 which is engaged as a force-fit in portion B.

Thus, when retracting or extending the writing tip 44 by turning the portions A and B relative to each other, the first element 10 is subjected to movement in translation for the purpose of bringing the writing tip 44 into its two positions.

The turning movement performed by the portion A of the writing implement drives the nib 28 to slide in the guide 20.

Since the second element 26 having the nib 28 is secured to the portion A of the writing implement, it is the first element 10 that is subjected to movement in translation, with its movement entraining the writing tip 44.

The first element 10 of the mechanism of the an embodiment of the present invention can be made as follows.

The first element 10 is a part made by injection molding a plastics material. For this purpose, two half-shells are provided so as to shape the outside portions of the walls 12 and 14 of the first element 10. One of the half-shells presents a recess corresponding to the first edge 16 of the first wall 12 covering an angular sector of 180°. Naturally, if the guide were to extend over more than 180°, then the other half-shell would present a recess extending the recess of the first half-shell, but at the risk of creating a rough point on the edge which would impede sliding of the nib. A core 36 is provided so as to form the inside portions of the walls 12 and 14 of the first element 10. The core 36 presents a recess 38 corresponding to the second edge 18. Plastics material is injected between the core 36 and the half-shells.

Thereafter, the shells are moved radially apart in a radial direction X since the edge 16 and the collar 40 of the first element 10 form two half-surfaces that are convex when seen from the ends of the axis X, and are consequently unmoldable by moving in translation into opposite directions. Withdrawing the mold radially in the transverse direction X constitutes an unmolding operation that is simple and quick to perform. The core 38 is withdrawn in a direction parallel to the central axis Z without leading to unmolding problems since the recess 38 is in a longitudinal end face of the core 36. This method of manufacture makes unmolding simple and fast while also enabling a guide 20 to be made that has a profile suitable for providing a high degree of comfort in use.

With prior art molding devices, in which the two edges of the guide are made by one of the two half-shells of the mold, it is necessary for the guide to have a flared section over the portions thereof that form an angle relative to the unmolding direction so as to ensure that the portion in relief in the mold that serves to form the guide is not itself blocked by the edge situated on the unmolding direction side. Against the flared portions of the guide, the nib comes into point contact with a transverse end of the edge, and that is harmful to good sliding and can even lead to premature wear of the mechanism.

The mechanism is not limited in any way to the embodiments described and shown which are given purely as examples.

The invention claimed is:

1. A writing implement mechanism comprising:
   a tubular first element having a central axis and comprising first and second walls which are fixed relative to each other, the first and second walls presenting first and second edges defining a guide extending longitudinally in a direction that is inclined relative to the central axis between a first end and a second end; and a second element adapted to slide along the first element and including a nib sliding in the guide,
   wherein the second wall is offset towards the central axis relative to the first wall in a direction that is radial relative to the central axis.

2. The writing implement mechanism according to claim 1, wherein the guide extends longitudinally in a helical shape.

3. The writing implement mechanism according to claim 1, wherein the first and second walls constitute portions of cylinders.

4. The writing implement mechanism according to claim 1, wherein at least one of the edges extends transversely in a direction that is radial relative to the central axis.

5. The writing implement mechanism according to claim 4, wherein the first edge extends transversely in a direction that is radial relative to the central axis over a first fraction only of the guide, and the second edge extends transversely in a direction that is radial relative to the central axis over a second fraction of the guide.

6. The writing implement mechanism according to claim 5, wherein the guide extends around the central axis over an angle lying in the range 60° to 180°.

7. The writing implement mechanism according to claim 5, wherein the inside transverse end of the first edge presents a radius substantially equal to the radius of the outside transverse end of the second edge.

8. The writing implement mechanism according to claim 1, wherein the second wall includes a collar having an outside radius substantially equal to the outside radius of the first wall, the collar including a face facing the edge of the first wall that extends in a plane that extends transversely to the central axis.

9. The writing implement mechanism according to claim 1, wherein the first element is made as a single piece of plastics material.

10. A writing implement comprising:
    a mechanism that includes:
    a tubular first element having a central axis and comprising first and second walls which are fixed relative to each other, the first and second walls presenting first and second edges defining a guide extending longitudinally in a direction that is inclined relative to the central axis between a first end and a second end; and
    a second element adapted to slide along the first element and including a nib sliding in the guide,
    wherein the second wall is offset towards the central axis relative to the first wall in a direction that is radial relative to the central axis; and
    a body extending along the central axis and comprising a first portion adapted to guide the first element of the mechanism in translation along the central axis, and a second portion to which the second element is connected, the first and second portions being mounted to pivot relative to each other about the central axis; and
a writing tip that is movable along the central axis through an opening in the body, and that is connected to the first element of the mechanism.

11. A method of manufacturing a writing implement mechanism according to claim 10, wherein the first element is made by injection molding a plastics material.

* * * * *